(12) United States Patent
Legare et al.

(10) Patent No.: US 8,460,423 B2
(45) Date of Patent: Jun. 11, 2013

(54) FILTER CARTRIDGE HAVING CENTRAL PLENUM AND HOUSING SIDEWALL

(75) Inventors: Pierre Legare, Brockville (CA); Britton G. Billingsley, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 385 days.

(21) Appl. No.: 12/783,904

(22) Filed: May 20, 2010

(65) Prior Publication Data
US 2011/0284006 A1   Nov. 24, 2011

(51) Int. Cl.
*B01D 46/00* (2006.01)
*A62B 23/02* (2006.01)

(52) U.S. Cl.
USPC ..... 55/486; 55/511; 55/DIG. 33; 55/DIG. 35; 96/134; 128/205.27; 128/205.29; 128/206.17

(58) Field of Classification Search
USPC ...... 128/205.27, 205.29, 206.17; 55/DIG. 12, 55/DIG. 33, DIG. 35, 496, 511; 96/134
See application file for complete search history.

(56) References Cited

U.S. PATENT DOCUMENTS

| | | | |
|---|---|---|---|
| 4,462,399 | A | 7/1984 | Braun |
| 4,543,112 | A | 9/1985 | Ackley et al. |
| 4,592,350 | A | 6/1986 | Maryyanek et al. |
| 4,886,058 | A | 12/1989 | Brostrom et al. |
| 5,033,465 | A | 7/1991 | Braun et al. |
| 5,052,385 | A | 10/1991 | Sundström |
| 5,078,132 | A | 1/1992 | Braun et al. |
| RE35,062 | E | 10/1995 | Brostrom et al. |
| 5,714,126 | A | 2/1998 | Frund |
| 5,732,695 | A | 3/1998 | Metzger |
| 5,763,078 | A | 6/1998 | Braun et al. |
| 5,952,420 | A | 9/1999 | Senkus et al. |
| 6,055,983 | A | 5/2000 | Metzger |

(Continued)

FOREIGN PATENT DOCUMENTS

| | | |
|---|---|---|
| KR | 20-0415989 | 5/2006 |
| KR | 10-2009-0099326 | 9/2009 |

(Continued)

OTHER PUBLICATIONS

ArmyGasMask.Com web page for U.S. M13A2 Gas Mask Filter Set for M17 Gas Series Masks, downloaded from internet on Oct. 21, 2010   http://www.armygasmasks.com/m13a2-gAS-mASK-fILTERS-p/aaagas-76.htm.

(Continued)

*Primary Examiner* — Robert Clemente
(74) *Attorney, Agent, or Firm* — Karl G. Hanson

(57) ABSTRACT

A filter cartridge 12 that has a first and second layer of filter media 38, 40 that each have first and second major surfaces 32, 44 and a perimeter 46 and that each contain active particulate that is bonded together. A plenum 42 is disposed between the first and second layers of filter media 38, 40 such that the plenum 42 interfaces with the second major surface 44, 44' of each layer of filter media. A housing sidewall 30 extends from the first layer of filter media 38 to the second layer of filter media 40 and is secured to the perimeter 46 of the first and second layers of filter media. The first major surfaces 32, 32' of the first and second layers of filter media 38, 40 are each fluid permeable and are each in fluid communication with an exterior gas space. A filter cartridge 12 having such a construction provides a bifurcated flow pattern in a higher volume structure.

29 Claims, 6 Drawing Sheets

U.S. PATENT DOCUMENTS

| | | |
|---|---|---|
| 6,146,449 A | 11/2000 | Lee et al. |
| 6,176,239 B1 | 1/2001 | Grove et al. |
| 6,216,693 B1 | 4/2001 | Rekow et al. |
| 6,391,429 B1 | 5/2002 | Senkus et al. |
| 6,761,169 B2 | 7/2004 | Eswarappa |
| 6,874,499 B2 | 4/2005 | Viner et al. |
| 7,311,764 B2 | 12/2007 | Friday et al. |
| 7,419,526 B2 | 9/2008 | Greer et al. |
| 7,497,217 B2 | 3/2009 | Viner et al. |
| 7,861,719 B1 | 1/2011 | Grove et al. |
| 2004/0055604 A1 | 3/2004 | Viner et al. |
| 2005/0139217 A1 | 6/2005 | Chiam |
| 2006/0096911 A1 | 5/2006 | Brey et al. |
| 2006/0254427 A1 | 11/2006 | Trend et al. |
| 2007/0163587 A1 | 7/2007 | Teibel |
| 2008/0289632 A1 | 11/2008 | Dankert et al. |
| 2009/0215345 A1 | 8/2009 | Brey et al. |

FOREIGN PATENT DOCUMENTS

| | | |
|---|---|---|
| WO | WO 97/20628 A1 | 6/1997 |
| WO | WO 00/24469 A1 | 4/2000 |
| WO | WO 03/090873 A1 | 11/2003 |

OTHER PUBLICATIONS

International Application No. PCT/US2011/036072 Search Report dated Jan. 19, 2012.

FILTER CARTRIDGE HAVING CENTRAL PLENUM AND HOUSING SIDEWALL

The present invention pertains to a filter cartridge that has a central plenum in conjunction with a housing sidewall. The housing sidewall frames the cartridge and may be made from a roll based material that is adhered to the perimeter of filter media layers, which layers are disposed on opposing sides of the central plenum. The filter cartridge is suitable for use in a respirator that provides clean filtered air to the wearer.

BACKGROUND

Respirators are devices that protect workers and others from harmful health effects associated with airborne hazards. The devices are worn about the face, acting to remove unwanted contaminants from the breathing air supply. The contaminants may be solid particles such as fumes, bioaerosols, or other particles, or they may be gasses or vapors, or combinations of such substances.

Respirators come in a variety of shapes and forms and are commonly designed according to the wearer's protection needs. Respiratory products range from simple filtering facepieces, typically referred to as dust masks, to more sophisticated systems that use an elastomeric facepiece in connection with one or more replaceable filtering cartridges. Some respiratory devices additionally employ a blower to assist in delivering a clean air supply to the wearer. These products typically are referred to as positive pressure respirators or powered air purifying respirators.

A variety of different filter cartridge designs have been developed over the years for use with respiratory masks. Typical filter cartridges contain a filter medium of active particulate disposed within a housing. Some designs have used packed beds of activated carbon in metal canisters—see for example, U.S. Pat. No. 4,543,112, or between support plates—see U.S. Pat. No. 7,419,526B2 to Greer et al. Other cartridges have used injection molded plastic housings—see, for example, U.S. Pat. Nos. 5,078,132 and 5,033,465 to Braun et al.—to contain the active particulate, which may be held together by bonding components—see also U.S. Pat. No. 5,952,420 to Senkus et al. and U.S. Pat. No. 6,216,693 to Rekow et al. In a more recent design, the investigators have described the use of a thermoformed housing to reduce overall cartridge weight—see U.S. Pat. Nos. 7,497,217 and 6,874,499 to Viner et al. Even though overall weight may be reduced with a thermoformed housing, known filter cartridges, which have used metal or plastic housings, have still had to contend with the added weight that comes with the complete housing structure. The typical filter cartridge also has not provided a dual flow pattern to reduce pressure drop across the filter media. Although bifurcated or dual flow cartridges also have been developed, which contain two spaced layers of filter media separated by a central plenum—see U.S. Pat. Re 35,062 to Brostrom et al.—these dual flow products, however, have not had a housing sidewall that defines the cartridge perimeter. As a result, the dual flow cartridges have generally contained lower volumes of filter media, which has placed limits on filter cartridge service life. Known filter cartridge products therefore have been confronted with a weight versus service life contest, which the present invention, as discussed below, addresses.

SUMMARY OF THE INVENTION

The present invention provides a new filter cartridge that comprises first and second filter media layers. These layers have first and second major surfaces and a perimeter and contain active particulate that is bonded together. The cartridge also has a plenum that is disposed between the first and second layers of filter media such that the plenum interfaces with the second major surface of each filter media layer. A housing sidewall extends from the first layer of filter media to the second layer of filter media and is secured to at least a portion of the perimeter of the first and second layers of filter media. The first major surfaces of the first and second layers of filter media are each fluid permeable and are each in fluid communication with an exterior gas space.

The present invention further provides a new method of making a filter cartridge, which method comprises: providing first and second filter media layers that each contain active particulate that is bonded together and that each comprise a perimeter; stacking the filter media layers in a spaced apart relationship; and securing a roll based housing sidewall to at least a portion of the perimeter of the filter media layers.

The filter cartridge of the present invention can provide extensive exposed surface area for filtration since it has two layers of filter media separated by a central plenum. Through use of a central plenum, dual air inflows may be provided, as opposed to a singular flow through a singular surface. The added filter media surface area is beneficial in that lower pressure drops can be achieved across the filter medium. Because the respirator wearer is often responsible for supplying the power needed to cause the air-to-be filtered to pass through the filter medium, a reduction in pressure drop can be very beneficial, particularly to user comfort. The provision of a housing sidewall in the present invention enables greater depth or thickness to be provided to the inventive filter cartridge, which increases volume and provides an extended product service life. The two filter media layers are secured at their perimeter to a housing sidewall that may extend from the exposed first surfaces of the filter media layers. Further, the invention is unique in that the united individual components of the filter cartridge—which by themselves are generally light in weight and have little structural capacity—provide a three-dimensional, lightweight construction that has sufficient structural integrity or rigidity to function as a filter cartridge. The housing sidewall can be derived from a simple roll-based material. The resulting product therefore may be light in weight for its total volume. And because an increased volume of filter media may be used, the product service life may be increased such that greater ratios of service life to weight or to volume are achieved. Further, the inventive method is beneficial in that the assembly operation may be rapidly achieved, despite the multi-layered cartridge structure. The individual layers can be joined together at the same time as forming the housing sidewall. The process therefore provides improved ease of manufacture, which in turn may lower product cost. In short, the inventive filter cartridge may provide respirator users with extended service lives, and improved comfort in the form of lower pressure drop and reduced product weight, and the inventive method may provide a nimble assembly operation for a multi-layered structure.

GLOSSARY

The terms set forth below will have the meanings as defined:

"active particulate" means particles or granules that are specifically suited to perform some action or function attributable to some characteristic or property including chemical properties such as catalysis and/or ion exchange and/or physical properties such as entrapment, adsorption, absorption, or combinations thereof;

"bonded" means held together through use of another contacting component or substance;

"clean air" means a volume of atmospheric ambient air that has been filtered to remove contaminants;

"exterior gas space" means the ambient atmospheric gas space into which exhaled gas enters after passing through and beyond the mask body and/or exhalation valve;

"filter cartridge" means a device that is attachable (removably or permanently) to a respirator mask body for purposes of filtering air before it enters the interior gas space;

"filter media" means an air-permeable structure that is designed to remove contaminants from air that passes through it;

"housing sidewall" means an air-impermeable surface that is located at at least a portion of the side of the structure;

"interface" means facing but not necessarily in direct contact with (there may be other layers therebetween);

"interior gas space" means the space between a mask body and a person's face;

"multiple" means four or more;

"plenum" means an area or space where more than one airflow path converges or meets another airflow path;

"plurality" means two or more;

"roll based" means obtained from a roll of the material; and

"secured" means joined together.

DETAILED DESCRIPTION OF PREFERRED EMBODIMENTS

In practicing the present invention, a filter cartridge is provided which is suitable for use in a negative pressure respirator of the type incorporating one or more detachable cartridges that are connected to an elastomeric facepiece. The filter cartridge employs a bifurcated airflow pattern that may be delivered to the facepiece interior through a fitting that is positioned on the cartridge exterior. Bifurcated filters have air flow paths that occur bi-directionally through two faces of the cartridge. The flow paths meet at a central plenum. These filter cartridges are sometimes referred to as split flow filters. A housing sidewall is secured to the perimeter of each of the spaced filter media layers to form a strip framed filter cartridge. The housing sidewall can take the form of a lightweight roll based material.

Figure 1:
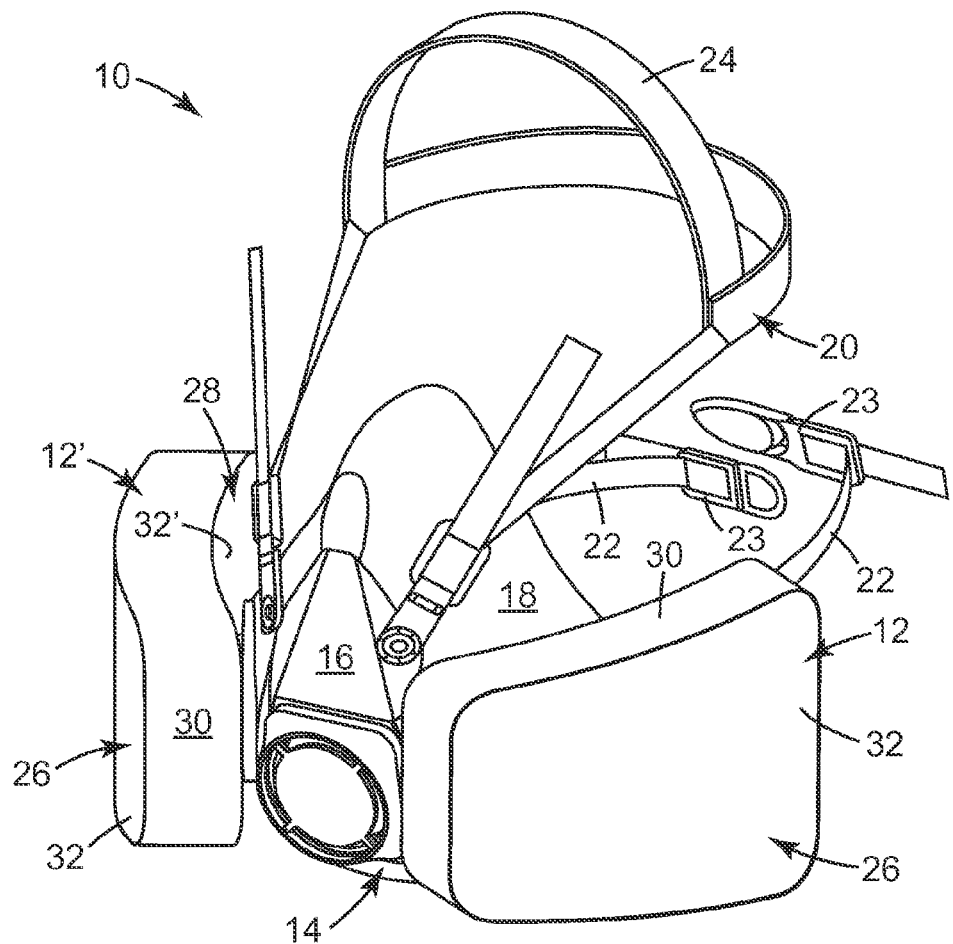
FIG. 1 is a perspective view of a respirator 10 that has first and second filter cartridges 12 and 12" located on opposing sides of a mask body 14.

FIG. 1 illustrates a respiratory mask 10 that may be worn by a person on their head covering the nose and mouth. The respiratory mask 10 has first and second filter cartridges 12 and 12' located on opposing sides of a mask body 14. The filter cartridges 12 and 12' may be detachable or permanently secured to the mask body 14. The cartridges 12, 12' filter ambient air before it passes into the interior gas space located within the mask body 14. The air that becomes present in the interior gas space is clean air that it suitable for wearer inhalation. The mask body 14 may include a rigid insert 16 and an elastomeric face-contacting portion 18. A mask body having such a construction is described in U.S. Pat. No. 7,650,884 to Flannigan et al. The respiratory mask 10 also has a harness 20 for supporting the mask body 14 on the wearer's head when the respirator is being worn. The harness 20 may take on various configurations but commonly includes one or more straps 22 that pass behind the wearer's head. The straps 22 may be joined together by one or more buckles 23. The harness 20 may be, for example, a drop-down harness as described in U.S. Pat. Nos. 6,732,733B1 and 6,457,473 to Brostrom et al., U.S. Pat. No. 5,691,837 to Byram, and U.S. Pat. No. 5,237,986 to Seppala et al. A crown member 24 optionally also may be employed to assist in supporting the mask body 14 on the wearer's head. The filter cartridges 12, 12' that are secured to the mask body 14 have first and second major surfaces 26 and 28 and a housing sidewall 30. The housing sidewall 30 extends at least from a first exposed major surface 32 of a first layer of filter media to at least a first exposed major surface 32' of a second layer of filter media. The housing sidewall 30 is secured to the perimeter of the first and second layers of filter media. The housing sidewall 30 will typically extend over the whole perimeter of the active particulate layers in the filter media so that no active particulate is visible from a side view of the cartridge. The housing sidewall 30 also could be provided with a flange that extends radially inward over the first and second exposed major surfaces 26 and 28. As illustrated, the filter cartridge may be curved from front to back. The cartridge also may be curved from top to bottom, or in both directions.

Figure 2:
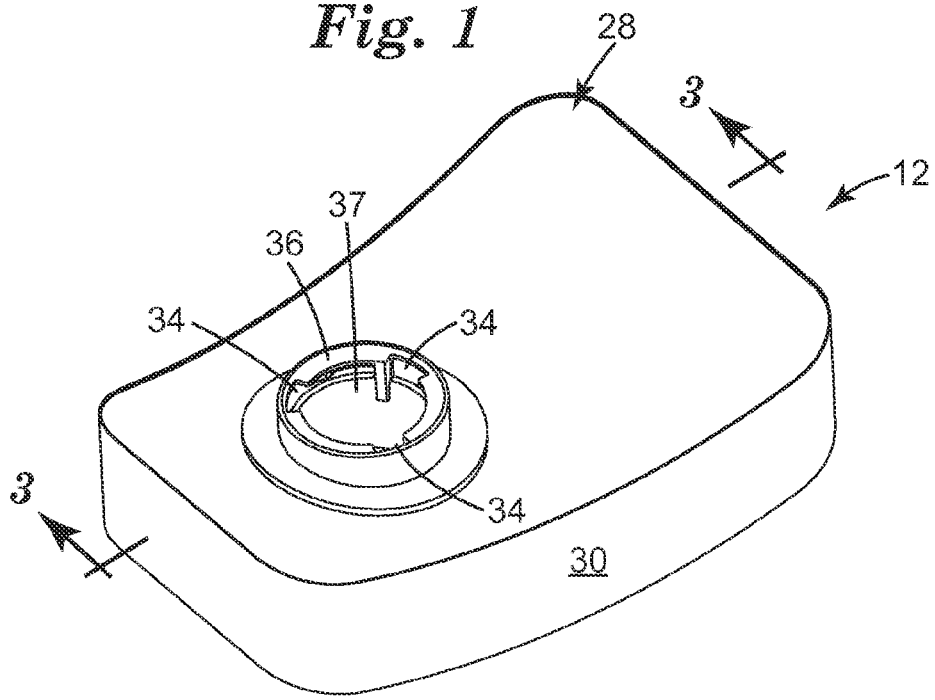
FIG. 2 is a perspective view of a filter cartridge 12 in accordance with the present invention, particularly illustrating its inner face 28.

FIG. 2 illustrates a reverse or inner side of the filter cartridge 12. A bayonet fitting 36 is present on the bottom surface 28 of the filter cartridge to allow for securement of the cartridge to a mask body. The fitting 36 also can provide a conduit (or access to a conduit) through the second layer of filter media into a centrally-disposed plenum. The mating of the mask body to the filter cartridge 12 may be achieved by inserting a male fitting that is disposed on the mask body into the bayonet fitting 36 and rotating the filter cartridge 12 in the appropriate direction relative to the mask body. The male fitting would have knobs disposed thereon which would mate with the cut-out notches 34 in the bayonet fitting 36. In use, air that passes through the first and second major surfaces 26 and 28 of the filter cartridge 12 enters a plenum which is in fluid communication with the opening 37 in the bayonet fitting 32. Thus, the bayonet fitting 36 may contribute to both a fluid communication and a securement means. Alternatively, a conduit and fitting may be provided on the housing sidewall 30, typically on the forward portion of the sidewall, rather than on the major surface 28. By repositioning the conduit and fitting onto the sidewall 30 and passing the air out through a slotted opening immediately adjacent the plenum, the effective filtering area on the cartridge surface 28 may be increased, which may result in improved performance, while reducing waste in the manufacturing process.

Figure 3:
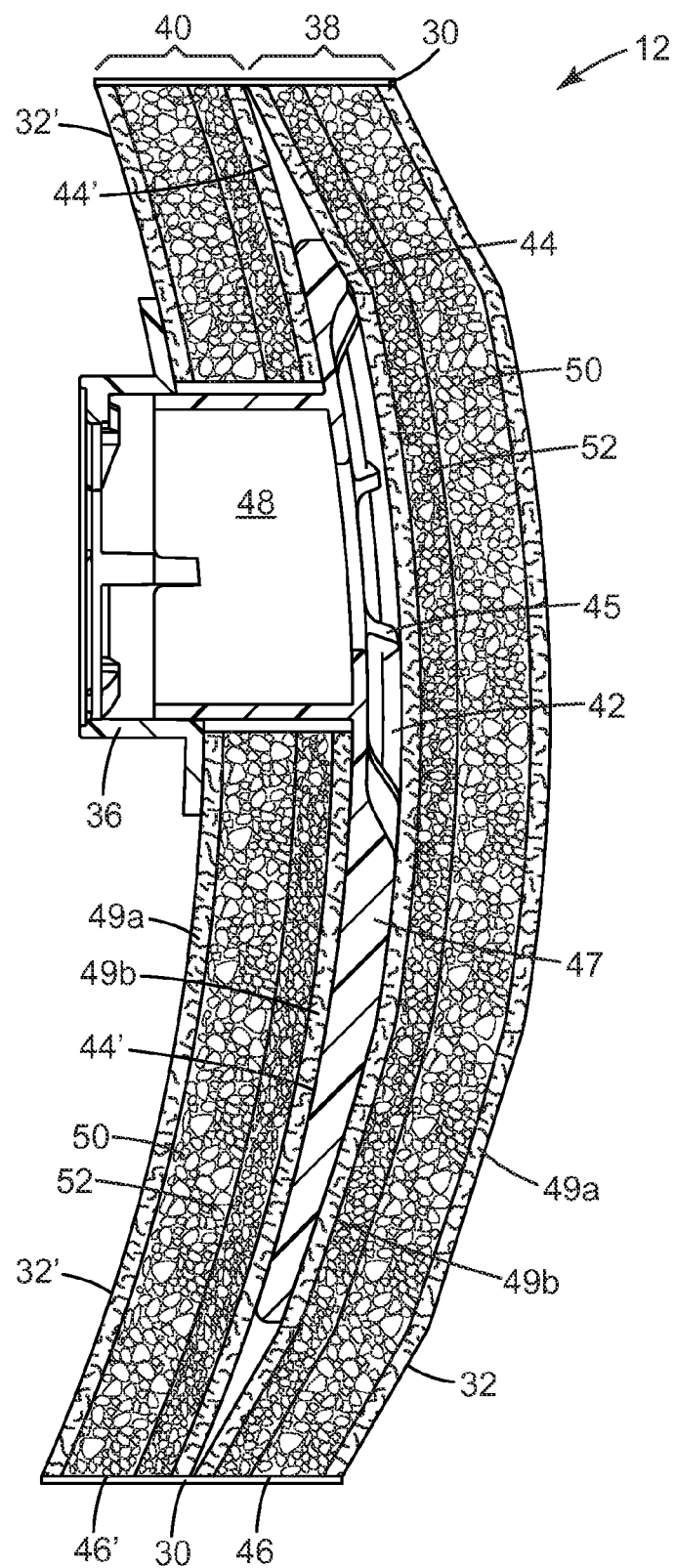
FIG. 3 is a cross-section of the filter cartridge 12 taken through lines 3-3 of FIG. 2.

FIG. 3 illustrates an example of the interior construction of the filter cartridge 12. As shown, the filter cartridge 12 contains first and second layers of filter media 38 and 40, respectively. Filter media layers 38 and 40 are each generally constant in thickness across each layer 38, 40. Unlike known dual flow filter cartridges (see, for example, U.S. Pat. Re 35, 062 to Brostrom and U.S. Pat. No. 5,732,695 to Metzger), the inventive filter cartridge does not have a reduced thickness at the perimeter 46, 46' of the layers of filter media 38, 40. The first and second layers of filter media 38, 40 are separated by a plenum 42. The first and second layers of filter media 38, 40 each have first major surfaces 32, 32', second major surfaces 44, 44', and a perimeter 46, 46'. The plenum 42 is disposed between the first and second layers of filtering media 38, 40 such that the plenum 42 interfaces with the second major surface 44, 44' of each layer of filter media 38, 40. The plenum may be defined by a spacer 45, which may take the form of a plastic structure that has a series of ribs 47 extending from the conduit 48 towards the perimeter 46, 46' of each filter media layer. The housing sidewall 30 generally extends from the first major surface 32 of the first layer 38 of filter media to the first major surface 32' of the second layer of filter media 40. The housing sidewall 30 may be secured to the perimeter 46, 46' of the first and second layers of filter media 38, 40, respectively, using an adequate securement means. The first major surfaces 32, 32' of the first and second layers of filter media 38, 40 are each fluid-permeable and are each in fluid communication with the exterior gas space. Cover webs 49a may be disposed on the outer surfaces of the first and second layers of filter media 38, 40. Cover webs 49b may be disposed on the inner surfaces of the first and second layers of filter media 38, 40. The cover webs 49a, 49b may serve to protect the active particulate layers 50, 52 by retaining the active particulate granules within each layer 50, 52. The coarse layer 50 is located upstream to the finer layer 52 and functions as a primary filtering layer, whereas the finer layer 52 acts as a polishing layer. The housing sidewall 30, which is disposed along the sides or periphery of the filter cartridge 12, may be roll based—that is, it may be taken from a roll and may be secured to the perimeter of the filter media layers 38, 40 by various means. The securement means may be achieved with an adhesive such as a pressure sensitive adhesive, a glue such as a hot met glue, a polyurethane reactive hot melt, or a UV curable adhesive. Examples of commercially available products that may be used to secure the housing sidewall 30 to the assembly 72 include 3M brand adhesives JetMelt™, Scotch-Weld™, and FastBond™. The securement means typically is disposed on the interior face of the sidewall 30, at least at the areas where the first and second layers of filter media 38, 40 make contact with the inner surface of the housing sidewall 30. The securement between the first and second layers of filter media 38, 40 and the interior surface of the housing sidewall 30 should be such that break-through does not occur when air is passing through the filter cartridge 12 during use. That is, air will not be able to circumvent the filtering capacity of the first and second layers of filter media 38, 40 by passing through the cartridge 12 along the housing sidewall. Although the filter media layers 38, 40 each have been illustrated as containing plural layers of active particulate, each filter media layer 38, 40 may include a single layer of active particulate.

Figure 4:
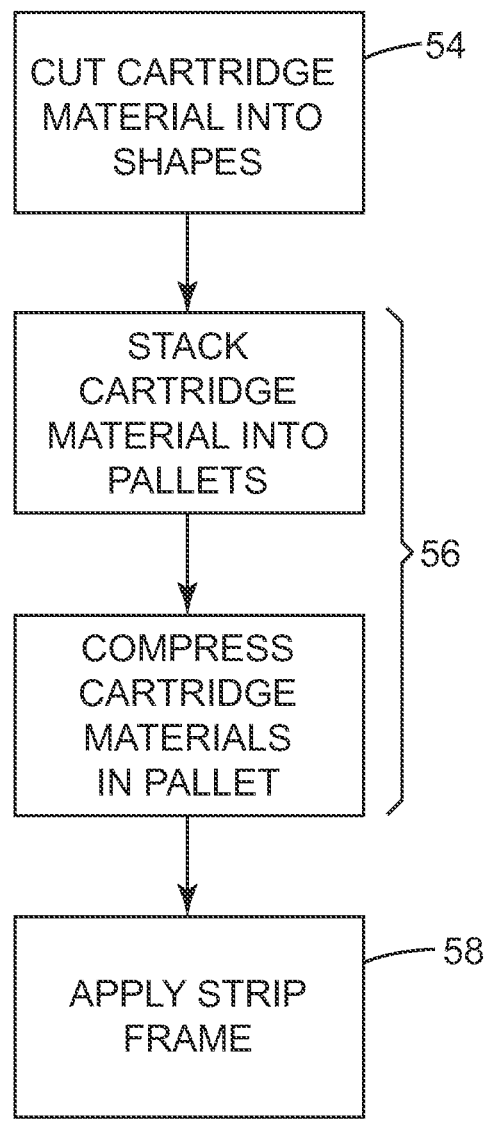
FIG. 4 is a flow chart, illustrating a method of making a filter cartridge 12 in accordance with the present invention.

FIG. 4 shows the general steps that may be used in making a filter cartridge in accordance with the present invention. As shown, the present invention basically comprises three steps: providing 54 filter media layers; assembling 56 the filter media layers in a stacked spaced apart relationship; and wrapping 58 the filter media layers along at least a portion of their perimeter. The filter media layers may be provided by constructing layers of the active particulate that is used to filter the air and cutting those layers normally thereto to provide a plurality of layers of filter media sized for use in the filter cartridge. These layers may be assembled together by stacking them in a spaced apart relationship relative to one another. A spacer may be provided between the layers to maintain their desired spacing. Further, the bayonet fitting, which also may provide a conduit into the plenum, may be provided through the second layer of filter media. The stacked layers are compressed into their desired position relative to each other. Once the layers are assembled in the desired position, the housing sidewall can be wrapped 58 about the perimeter of the assembled layers to provide a filter cartridge that is generally lightweight in mass and is of a sturdy construction.

Figure 5:
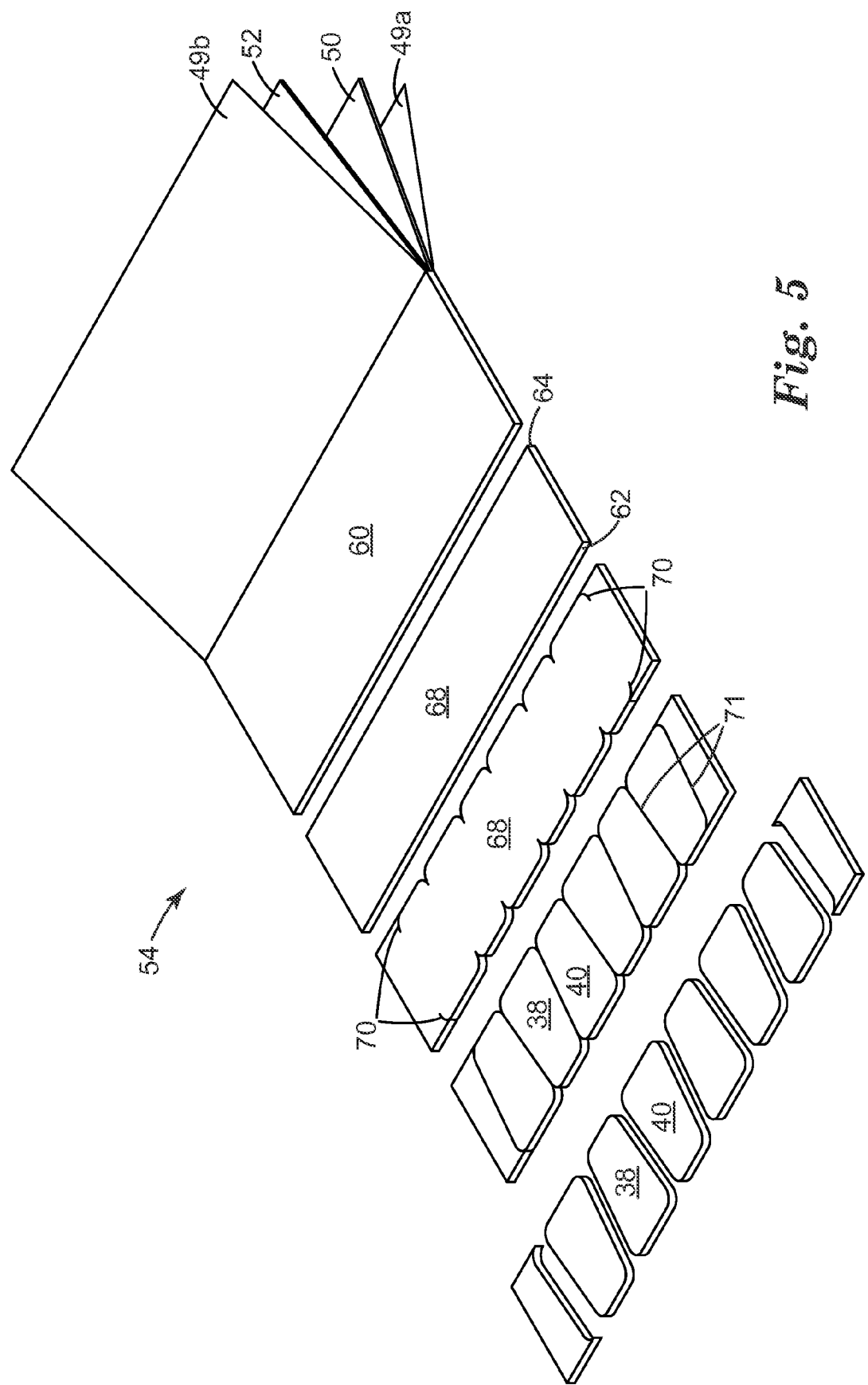
FIG. 5 is a perspective view of a filter media production step 54 that may be used in conjunction with the present invention.

FIG. 5 illustrates an operation that may be used in providing the first and second layers of filter media 38, 40 that are subsequently assembled and wrapped with a housing sidewall 30. Multiple layers of material may be used in assembling a layer of filter media for use in accordance with the present invention. For example, a first cover web 49a, a first layer of active particulate 50, a second layer of active particulate 52, and a second cover web 49b may be assembled to provide a filter media blank 60. The first and second layers of the cover web 49a and 49b may be provided on opposing sides of the layers of active particulate 50, 52 to protect the layers and to ensure that the granules are retained within the composite filter media structure. As indicated above, the first layer of active particulate 50 may be constructed to have a lower pressure drop and larger pore size than the second layer of active particulate 52. This may be achieved through use of larger particles in the first layer 50 than in the second layer 52. The first layer of active particulate 50 therefore acts as a primary filtering layer, whereas the second layer 52 acts as a back-up layer. While the first layer of active particulate 50 may have a lower pressure drop, it generally would have a greater thickness and therefore is fashioned to remove a larger quantity of contaminants than the second layer 52. Although the second layer 52 may generally have a higher pressure drop, it also may have a higher kinetics and therefore would remove contaminants that may have passed through the first layer 52. Accordingly, the second layer is generally referred to as a polishing layer. The size of the active particulate that would be used in the first layer 50 may generally be about 12×30 mesh to 20×40 mesh, whereas the active particulate in the second layer 52 may generally be sized to be about 40×140 mesh to 80×320 mesh. The thickness of the primary filtering layer may be about 5 millimeters (mm) to 25 mm, and the thickness of the polishing layer may be about 1 to 4 mm. Once the multiple layers of cover web and active particulate have been assembled into a multi-layer blank 60, this blank is cut crosswise linearly along lines 62 and 64. The distance between the cut lines 62 and 64 define the length of the filter media that will be placed in the cartridge housing. The severed blank 68 is then subjected to a further cutting operation where rounded corners 70 are provided on the cut blank 60. These rounded corners 70 generally define the width of the filter media layers that will be disposed within the cartridge housing. Subsequent to the cutting step that defines the corners, a series of lengthwise cuts 71 are provided to fully define the shape and configuration of each filter media layer that would be disposed in the filter cartridge. These cut layers are then separated so that they can be directed to the subsequent assembly step. The separation may be achieved by flipping the arrangement upon itself.

Figure 6:
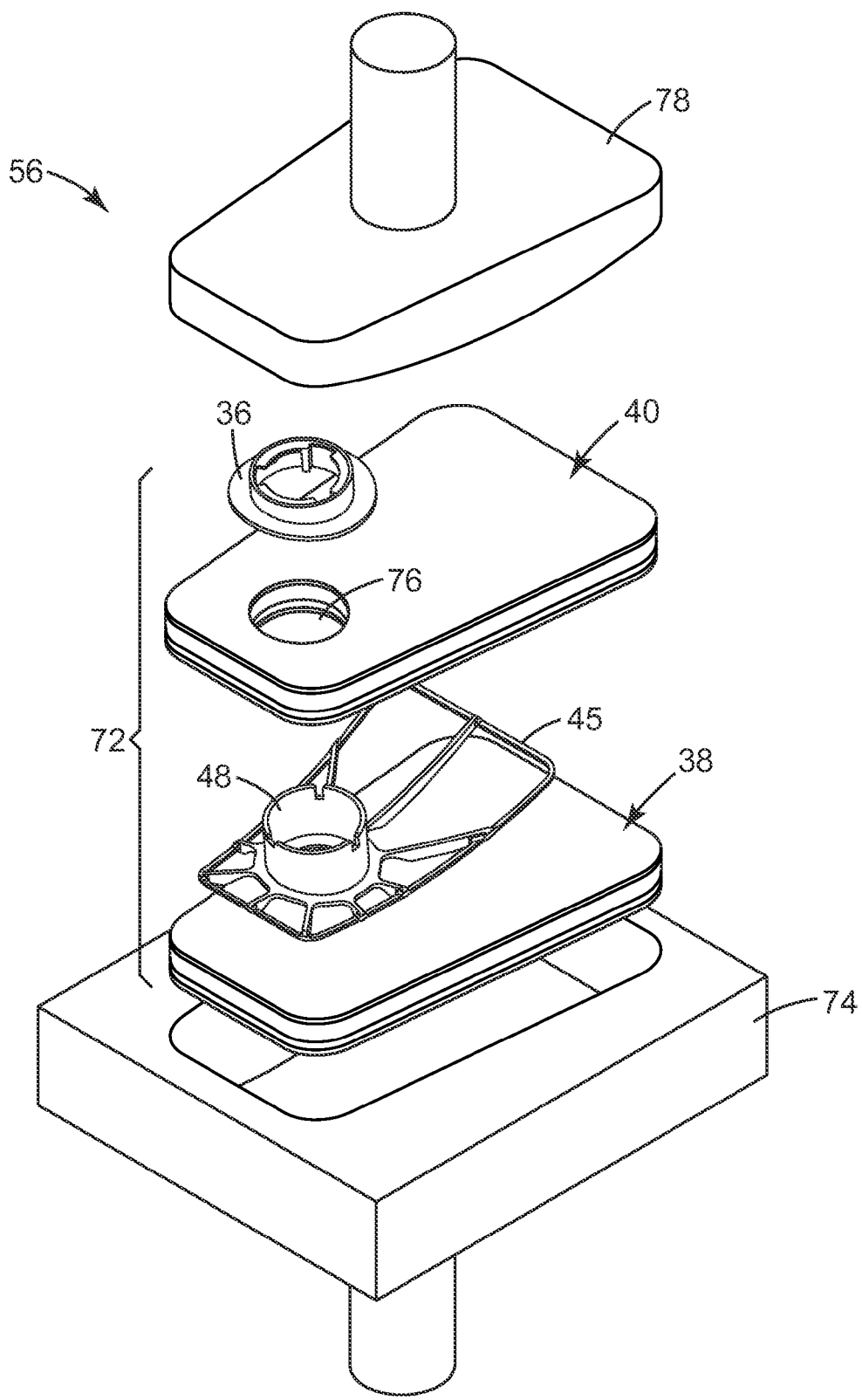
FIG. 6 is a stacking step 56 that may be used in connection with making a filter cartridge of the present invention.

FIG. 6 illustrates the step of assembling the individual filter media layers 38, 40 and plenum spacer 45 into a construction that would define the filter cartridge interior. In constructing the interior assembly 72 for the filter cartridge, the second layer of filter media 40, the spacer 45, the first layer of filter media 38, and the bayonet fitting 36 are sequentially placed in a receptacle 74. The second layer of filter media 40 is distinguished from the first layer of filter media 38 in that the second layer of filter media 40 has an opening 76 located therein so that a conduit 48 can pass therethrough. The conduit 48 extends normal from the plenum spacer 45 in a tubular fashion. The bayonet fitting 36 is joined to the conduit member 48 as illustrated in FIG. 3. Once the parts are appropriately aligned, the plunger 78 is used to press the assembled items together to create first and second layers of filter media 38 and 40 that are separated from each other in a spatial relationship. The spacer 45 ensures the proper spatial distance between layers 38 and 40 and helps distribute airflow from the filter media layers 38 and 40 into the conduit 48.

Figure 7:
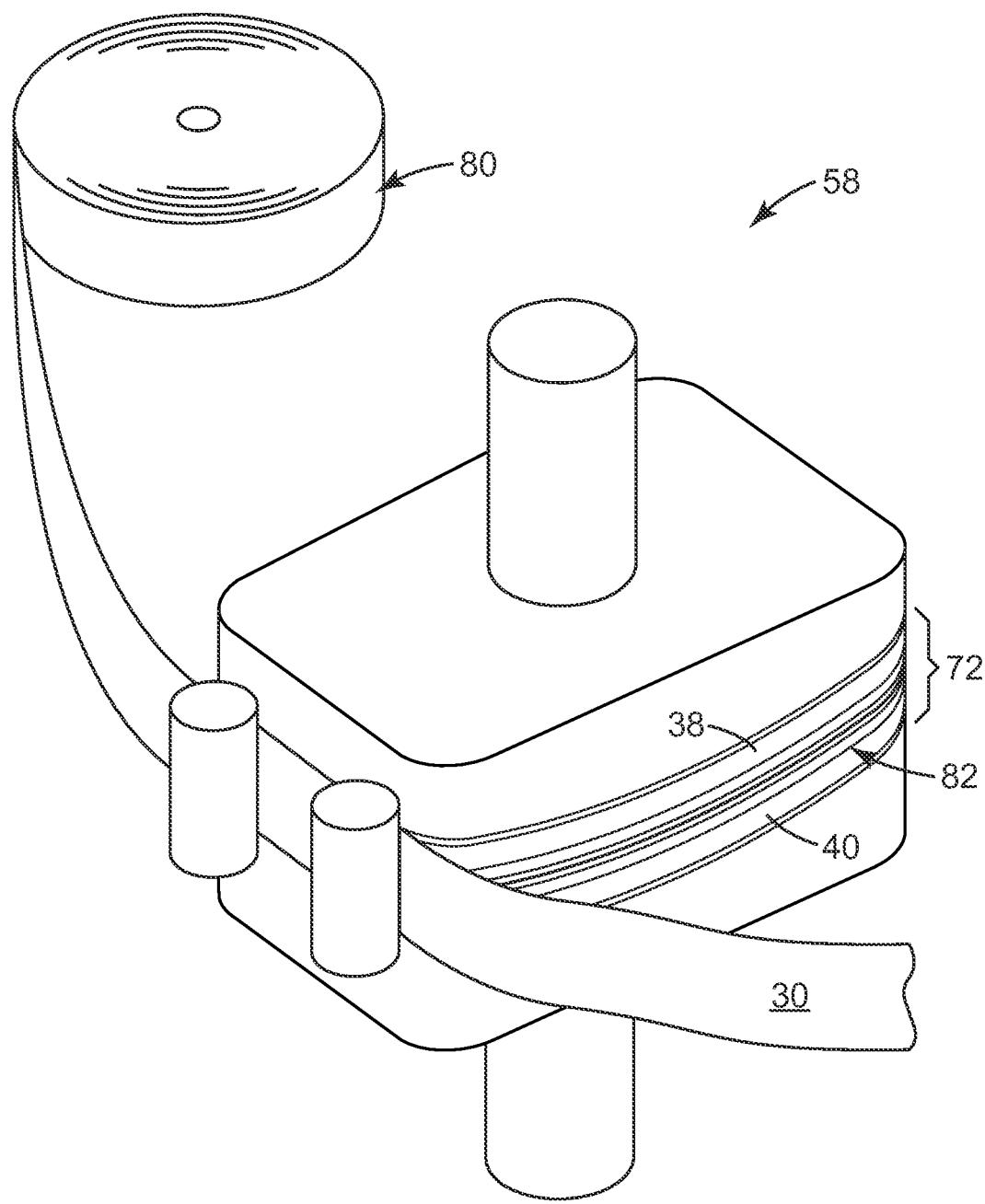
FIG. 7 is perspective view of a wrapping step 58 that may be used to make a filter cartridge in accordance with the present invention.

FIG. 7 shows the assemblage 72 in the proper compressed state, ready for having the housing sidewall 30 applied thereto. The housing sidewall 30 is withdrawn from a roll 80 and is secured to the perimeter 82 of the filter cartridge assembly 72. In particular, the housing sidewall 30 is secured to the first and second layers of filter media 38 and 40 such that no significant breakthrough occurs along the perimeter 82. To this end, a suitable bonding means may be disposed on the interior surface of the material used to make the housing sidewall. Once the housing sidewall 30 is properly secured to the perimeter 82 of the cartridge assembly 72, the resulting filter cartridge may be attached to a mask body for purposes of filtering air.

The present invention is particularly beneficial in that it provides a simple housing system that recognizes the need for a low cost solution given the status of the filter as a consumable item. The housing sidewall may comprise a band of paperboard to which the internal layers are adhesively fixed. Alternatively a thin plastic band can be applied, for example a 0.1 to 0.2 mm thick plastic with suitable properties, for example polyester, if additional robustness is desired. Plural-layered roll based materials also may be used. The exterior surface desirably is able to accept printable indicia. The sidewall typically will have a width of about 2 to 3 centimeters (cm) but can be increased to as much as 6 cm, where significant volume of carbon is required for a targeted application or a specific regulatory standards' approval. The sidewall thickness typically is about 0.1 to 0.5 mm. The sidewall band can be formed using a die cutting process, as opposed to more expensive injection molding commonly used in making other filter housing designs. Filter cartridges of the present invention may exhibit organic vapor service life to weight ratios (minutes/gram) of greater than 0.9, still greater than 1.0, and yet still greater than 1.1. The inventive cartridges also may have organic vapor service life to volume ratios of greater than 0.35, still greater than 0.4, and yet still greater than 0.45. The organic vapor service life may be determined according to the test set forth below in the Example section.

Because the resulting filter cartridge is made from a housing that essentially comprises a roll-based sidewall, the cartridge may weigh substantially less than known filter cartridges. Known filter cartridges typically use extruded plastics or possess a solid housing base, which increases overall product weight. The inventive cartridge has two exposed surfaces through which air may pass to enter the plenum. The use of two fluid-impermeable faces on the filter cartridge not only reduces weight but also reduces pressure drop. The resulting cartridge therefore may be light in weight and easy to breath through.

The filter media that is used in the present invention contains active particulate that is bonded together through various means. One subclass of such particulate materials is particles that interact with components in a fluid to remove or alter their composition. The components in the fluid may be sorbed onto or into the active particulate, or they may be reacted with a second component that may or may not be present on the activated particulate. Thus, the active particulate may be sorptive, catalytic, reactive, or combinations thereof. A variety of active particulate can be employed. Desirably the active particulate is capable of absorbing or adsorbing gases, aerosols, or liquids that are expected to be present under the intended use conditions. The sorbent particles can be in any usable form including beads, flakes, granules, or agglomerates. Typical sorbent particles include activated carbon; alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Activated carbon and alumina are common sorbent particles. Mixtures of sorbent particles also can be employed, e.g., to absorb mixtures of gases, although in practice to deal with mixtures of gases it may be better to fabricate a multilayer sheet article employing separate sorbent particles in the individual layers. The desired active particulate size can vary a great deal and usually will be chosen based in part on the intended use conditions. As a general guide, the active particulate may vary in size from about 5 to 3000 micrometers in average diameter. Commonly the particles are less than about 1500 micrometers in average diameter, more typically between about 30 and about 800 micrometers in average diameter, and still more typically between about 100 and about 300 micrometers in average diameter. The activate particulate can be additionally treated with one or more impregnants to enhance gas removal capability. Examples of treated active particulate materials include chemically surface-treated activated carbon—see for example U.S. Pat. Nos. 7,309,513 and 7,004,990 to Brey et al., U.S. Pat. No. 6,767,860 to Hem et al., U.S. Pat. No. 6,344,071 to Smith et al., and U.S. Pat. Nos. 5,496,785 and 5,344,626 to Abler. Typical particulates for acting as sorbents in an air-purifying system are activated carbon, chemically-treated carbon, and alumina adsorbent particulate. An example of commercially available activated carbon that can be used is sold under the trademark Kuraray, such as Kuraray GG or GC, which are described in product bulletin 8712-1000 of the Kuraray Carbon Co., Ltd. Other commercial products are CECACARBON™ activated carbon products.

The first and second layers of filtering media contain active particulate that is bonded together through one or more various means. For example, the active particulate can be joined together through use of PSA microparticulate as described in U.S. Pat. No. 6,391,429 to Senkus et al. When using such an approach, the adhesive polymer microparticulate is generally smaller in size than the active particulate. The adhesive polymer microparticulate may be, for example, about 1 to about 1,000 micrometers in size. The adhesive polymer microparticulate may be distributed among the active particulate in amounts sufficient to adhere them together in a flexible composite structure. The microparticulate may be in the form of solid polyacrylate beads and may comprise a copolymer having repeating units comprising those derived from acrylic acid ester of a non-tertiary alcohol having 1 to 14 carbon atoms and a polar monomer. The repeating units may further comprise those derived from vinyl acetate. The repeating units may comprise those derived from compounds selected from the group consisting of a higher vinyl ester, styrene sulfonate salt, multi-vinyl monomer, and alpha, beta-ethylenically unsaturated poly(alkyleneoxy)sulfate, or combinations thereof. In the approach described in U.S. Pat. No. 5,078,132 to Braun et al., the active particulate may be joined together by binder particles. The binder materials that are suitable for use in joining active particulate together generally satisfy the polymer binder melt test referenced in the '132 patent. Alternatively, the active particulate may be joined together by polymeric fibers to create a porous sheet-like article. The porous sheet-like article may be a self-supporting nonwoven web that has less than about 20 weight percent polymeric fibers. The active particulate is sufficiently evenly distributed in the web amongst the fiber polymers such that the web has an Absorption Factor A of at least $1.6 \times 10^4$/mm water. The Adsorption Factor A can be calculated using parameters or measurements similar to those described in Wood, *Journal of the American Industrial Hygiene Association,* 55(1):11-15 (1994). The following U.S. patent application publications describe active particulate that is held together by polymeric fibers suitable for use in the present invention: 2006/0096911A1 to Brey et al., 2006/0254427A1 to Trend et al., and 2009/0215345A1 to Brey et al.

The fibers that are used to bond active particulate together may be made from blends of polymeric materials, for example, blends of polyolefin elastomers and elastomeric styrenic block copolymers. If desired, a portion of the disclosed web can represent polymers or other fibrous or fiber-forming materials, which would not by themselves exhibit adequate resistance to dimethylmethylphosphorate (DMMP) uptake or which would not by themselves provide a web with the desired Adsorption Factor A. For example, suitably loaded webs made from the linear low density polyethylene DOWLEX 2517 has been shown to have an Adsorption Factor A of about $2.1 \times 10^4$/mm water, whereas a similarly loaded web made from the linear low density polyethylene DOWLEX 2503 has been shown to have an Adsorption Factor A of about $1.0 \times 10^4$/mm water. Also, unloaded webs made from 90:10 and 50:50 blends of the polyolefin elastomer ENGAGE 8402 and the styrenic block copolymer KRATON G1657 have been shown to have very low DMMP uptake, and a 91 wt % carbon-loaded web in which the polymeric material is only ENGAGE 8402 has been shown to have an Adsorption Factor A of about $2.6 \times 10^4$/mm water, whereas an 88 wt. % carbon-loaded web in which the polymeric material is only KRATON G1657 is shown below to exhibit an Adsorption Factor A of about $1.4 \times 10^4$/mm water.

The filter media layers also may be formed from multicomponent fibers such as core-sheath fibers, splittable or side-by-side bicomponent fibers or so-called "islands in the sea" fibers. In addition, the filter media layers may be formed using other polymeric materials as one or more of the components, or by adding other fibrous or fiber-forming materials including staple fibers (e.g., of natural or synthetic materials) and the like. Typically, however, relatively low amounts of other fibrous or fiber-forming materials have been used in the disclosed webs so as not to detract unduly from the desired sorbent particle loading level and finished web properties.

The polymer fibers, as noted above, exhibit no more than about 1 weight percent DMMP uptake after an unloaded web of such fibers has been exposed to air saturated with DMMP vapor at room temperature for six days. The polymer fibers may under such conditions exhibit no more than about 0.5 weight percent DMMP uptake, no more than about 0.3 weight percent DMMP uptake, or no more than about 0.2 weight percent DMMP uptake.

The polymers used in the fibers that bond the active particulate together may have (but is not required to have) greater elasticity than similar caliper polypropylene fibers. The polymer also may be but is not required to be "elastomeric", that is a material that may be stretched to at least 125 percent of its initial relaxed length and that may recover to substantially its initial relaxed length upon release of the biasing force. The polymer in fiber form also may have (but is not required to have) greater crystallization shrinkage than similar caliper polypropylene fibers. Fibers that have such elasticity or crystallization shrinkage characteristics may promote autoconsolidation or densification of the filter media layer, reduction in the web pore volume, or reduction in the pathways through which gases can pass without encountering an available sorbent particle. Densification may be promoted in some instances by forced cooling of the web using, for example, a spray of water or other cooling fluid, or by annealing the collected web in an unrestrained or restrained manner. Annealing times and temperatures may depend on various factors including the polymeric fibers employed and the sorbent particle loading level.

Mixtures (e.g., bimodal mixtures) of sorbent particles that have different sizes also can be employed in the filter media layers, although in practice it may be better to fabricate a multilayer sheet article that contains larger sorbent particles in an upstream layer and smaller sorbent particles in a downstream layer. At least 80 weight percent active particulate particles, more preferably at least 84 weight percent, and most preferably at least 90 weight percent active particulate particles are typically enmeshed in the fibrous web. Expressed in terms of basis weight, the active particle loading level may, for example, be at least about 100 g/m² (gsm) for relatively fine (namely, small diameter) particles, and at least about 500 g/m² for relatively coarse particles.

The use of a loaded web that comprises active particulate disposed within an elastic polymeric fibrous web is beneficial in that it enables conformal filter shapes to be made without use of a supporting rigid plastic or metal housing system. Conformal shapes are shapes that exhibit curvature in one or more dimensions. The filter cartridge may be fashioned to curve front-to-back or top-to-bottom or both. Ideally the curvature is set to follow the shape of the facepiece, resulting in a more overall compact respirator, which may improve wearer visibility. Further, particulate webs can be stacked on top of the loaded webs to additionally provide particulate removal capabilities. In another embodiment particulate filtering layers alone can be applied where gas removal capability is not needed. The particulate filter layers may comprise nonwoven webs of electrically charged microfibers, particularly polymeric melt-blown microfibers or BMF—see, for example, U.S. Pat. No. 7,244,291 to Spartz et al, U.S. Pat. No. 6,397,458 to Jones et al., and U.S. Pat. No. 6,119,691 to Angadjivand et al. Microfibers typically have an effective fiber diameter of less than about 25 micrometers, more commonly less than about 15 micrometers. Electrically charged webs that contain such fibers may be manufacture as described, for example, in U.S. Pat. No. 6,846,450 to Erickson et al., U.S. Pat. No. 6,824,718 to Eitzman, and U.S. Pat. No. 5,496,507 to Angadjivand et al.

Cover webs that are used in conjunction with the filter media layers typically do not provide any substantial filtering benefits to the filtering structure, although it can act as a pre-filter when disposed on the exterior (or upstream to) the filtration layer. The cover web may be fashioned to have a basis weight of about 5 to 50 grams per square meter (g/m²), typically 10 to 30 g/m², and may contain microfibers as well. Fibers used in the cover web often have an average fiber diameter of about 5 to 24 micrometers, typically of about 7 to 18 micrometers, and more typically of about 8 to 12 micrometers. The cover web material may have a degree of elasticity (typically, but not necessarily, 100 to 200% at break) and may be plastically deformable. The cover web may contain polymeric spunbond fibers made from, for example, polypropylene.

Cover webs that are used in the invention preferably have very few fibers protruding from the web surface after processing and therefore have a smooth outer surface. Examples of cover webs that may be used in the present invention are disclosed, for example, in U.S. Pat. No. 6,041,782 to Angadjivand, U.S. Pat. No. 6,123,077 to Bostock et al., and WO 96/28216A to Bostock et al.

EXAMPLES

OV Service Life Test

To determine the service lives of the filtration devices, they were challenged with 1000 parts per million (ppm) cyclohexane at 32 liters per minute and at 50% relative humidity. The amount of time that elapsed when the devices allowed 5 ppm of cyclohexane to exit the filter determined the service life. The test method was similar to NIOSH Test method RCT-APR-STP-0046. Equivalent equipment was used. Filters were tested in an as received condition.

Example 1

Carbon loaded BMF webs were made according to U.S. Patent Application No. 2006/096911. The polymer fibers were produced using Vistamaxx™ 2125 resin, produced my ExxonMobil.

The bulk carbon loaded webs were compressed to about 4.7 mm in thickness using a Carver heated platen press that had 12 inch by 12 inch platens. The platen temperatures were 200° F. The pressure was 3000 pounds per square inch (psi) total, and the press time was 5 seconds.

In the following description, OV refers to organic vapor, and gsm means grams per square meter. The bulk and polishing layers had the construction set forth in Table 1.

TABLE 1

| Properties and Materials | OV Bulk | OV Polishing |
| --- | --- | --- |
| Web weight total(gsm) | 1482 | 428 |
| Polymer wt (gsm) | 54 | 42 |
| Carbon | Kuraray GC 12 × 20 | Kuraray GC 60 × 150 |
| Web Thickness - final | 4.5 mm | 2 mm |

The filter was assembled having the following order of layers:
OV Bulk
OV Bulk
OV Polishing
Plenum structure
OV Polishing
OV Bulk
OV Bulk The layers were die cut into a trapezoidal shape having a surface area of about 67 square centimeters. The layers were arranged in the order indicated above and were sealed around their perimeter by applying a paperboard strip of 0.5 mm thickness. A 3M grade 3764 hot melt adhesive was used to secure the strip around the perimeter of the layered assembly. The plenum structure, consisting of a mechanical component similar to that shown in the drawings, generated a plenum gap thickness between the upper and lower layers of 4 mm.

Comparative Example 1

Kuraray GC 12×20 carbon (105 cc) was storm filled into a 3M 6000 respiratory filter cartridge body, and a lid was ultrasonic welded to the top.

Comparative Example 2

A bifurcated filter cartridge that lacks a housing sidewall was used. This product had the construction described in U.S. Pat. RE 35,062 to Brostrom.

The filter cartridges of Example 1 and Comparative Examples 2 and 3 were weighed, measured for volume, and tested for organic vapor service life. The service lives were divided by the cartridge weight and volume to give SL/wt and SL/vol ratios. The results are set forth below in Table 2.

TABLE 2

| Example | Weight (g) | Volume (ml) | Service Life (mins) | SL/wt (mins/s) | SL/vol (mins/ml) |
| --- | --- | --- | --- | --- | --- |
| 1 | 72.72 | 170.4 | 87 | 1.15 | .49 |
| C1 | 100.4 | 281.4 | 84 | 0.84 | 0.3 |
| C2 | 13.34 | 129.9 | 4 | 0.3 | 0.03 |

The data set forth above demonstrates that the inventive filter cartridge exhibits better ratios of service life to weight or to volume than the comparative single or bifurcated flow filter cartridges.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:
1. A filter cartridge that comprises:
  (a) a first layer of filter media that has first and second major surfaces and a perimeter and that contains active particulate that is bonded together;
  (b) a second layer of filter media that has first and second major surfaces and a perimeter and that contains active particulate that is bonded together;
  (c) a plenum that is disposed between the first and second layers of filter media such that the plenum interfaces with the second major surface of each layer of filter media; and
  (d) a housing sidewall that extends from the first layer of filter media to the second layer of filter media and that is secured to at least a portion of the perimeter of the first and second layers of filter media, wherein the first major surfaces of the first and second layers of filter media are each fluid permeable and are each in fluid communication with an exterior gas space, and wherein the first and second layers of filter media do not have a reduced thickness at the perimeter.

2. The filter cartridge of claim 1, wherein the housing sidewall is roll based.

3. The filter cartridge of claim 2, wherein the housing sidewall has an adhesive or a glue on the interior face of the sidewall.

4. The filter cartridge of claim 3, wherein the adhesive or glue comprises a pressure sensitive adhesive or hot melt.

5. The filter cartridge of claim 1, wherein the plenum comprises a plastic structure that has one or more ribs extending from a conduit towards a perimeter of the filter cartridge.

6. The filter cartridge of claim 1, wherein the first and second layers of filter media each have at least one cover web layer juxtapositioned against a layer of active particulate.

7. The filter cartridge of claim 6, wherein the first and second layers of filter media each comprise first and second layers of active particulate.

8. The filter cartridge of claim 1, wherein the housing sidewall comprises a roll based band of paperboard, a roll based band of plastic material, or a roll based plural-layered band of material.

9. The filter cartridge of claim 8, wherein the housing sidewall has a width of 2 to 3 centimeters and a thickness of 0.1 to 0.5 millimeters.

10. The filter cartridge of claim 9, exhibiting a service life to weight ratio of greater than 0.9 minutes per gram, and a service life to volume ratio of greater than 0.35 minutes per milliliter.

11. The filter cartridge of claim 1, exhibiting a service life to weight ratio of greater than 1.0 minutes per gram, and a service life to volume ratio of greater than 0.4 minutes per milliliter.

12. The filter cartridge of claim 1, exhibiting a service life to weight ratio of greater than 1.1 minutes per gram, and a service life to volume ratio of greater than 0.45 minutes per milliliter.

13. The filter cartridge of claim 1, wherein the active particulate comprises activated carbon particles, and wherein the activated carbon particles are bonded together by PSA microparticulate or by binder particles.

14. The filter cartridge of claim 1, wherein the active particulate comprises activated carbon particles, and wherein the activated carbon particles are bonded together by nonwoven polymeric fibers to form a self supporting layer of activated carbon particles and polymeric fibers.

15. The filter cartridge of claim 14, wherein the activated carbon particles are evenly distributed in the web such that the web exhibits an Absorption Factor A of at least $1.6 \times 10^4$/mm water.

16. The filter cartridge of claim 15, wherein the polymeric fibers comprise elastomeric fibers.

17. The filter cartridge of claim 15, wherein the polymeric fibers comprise polypropylene.

18. The filter cartridge of claim 1, wherein each layer of filter media comprises first and second layers of active particulate bonded together by nonwoven polymeric fibers.

19. The filter cartridge of claim 1, being curved from front to back or from top to bottom or both.

20. A respirator that comprises one or more of the filter cartridges of claim 1.

21. The filter cartridge of claim 1, wherein the first and second layers of filter media are each generally constant in across each layer.

22. A filter cartridge that comprises:
(a) a first layer of filter media that has first and second major surfaces and a perimeter and that contains active particulate that is bonded together;
(b) a second layer of filter media that has first and second major surfaces and a perimeter and that contains active particulate that is bonded together;
(c) a plenum that is disposed between the first and second layers of filter media such that the plenum interfaces with the second major surface of each layer of filter media; and
(d) a housing sidewall that extends from the first layer of filter media to the second layer of filter media and that is secured to at least a portion of the perimeter of the first and second layers of filter media, wherein the first major surfaces of the first and second layers of filter media are each fluid permeable and are each in fluid communication with an exterior gas space, wherein the filter cartridge exhibits a service life to weight ratio of greater than 0.9 minutes per gram.

23. The filter cartridge of claim 22, wherein the filter cartridge exhibits a service life to weight ratio of greater than 1.0 minutes per gram.

24. The filter cartridge of claim 22, wherein the filter cartridge exhibits a service life to weight ratio of greater than 1.1 minutes per gram.

25. A respirator that comprises one or more of the filter cartridges of claim 22.

26. A filter cartridge that comprises:
(a) a first layer of filter media that has first and second major surfaces and a perimeter and that contains active particulate that is bonded together;
(b) a second layer of filter media that has first and second major surfaces and a perimeter and that contains active particulate that is bonded together;
(c) a plenum that is disposed between the first and second layers of filter media such that the plenum interfaces with the second major surface of each layer of filter media; and
(d) a housing sidewall that has a width of at least two centimeters in extending from the first layer of filter media to the second layer of filter media and that is secured to at least a portion of the perimeter of the first and second layers of filter media, wherein the first major surfaces of the first and second layers of filter media are each fluid permeable and are each in fluid communication with an exterior gas space, and wherein the first and second layers of filter media are secured to the perimeter of the first and second layers of filter media at an interior face of the housing sidewall using an adhesive such that no significant breakthrough occurs and there is not a reduction in thickness of the first and second layers of filter media at the perimeter.

27. The filter cartridge of claim 26, wherein the filter cartridge is curved from top to bottom or front to back or both.

28. The filter cartridge of claim 26, wherein the housing sidewall is roll based.

29. A respirator that comprises one or more filter cartridges of claim 26.

* * * * *